United States Patent Office 2,999,621
Patented Sept. 12, 1961

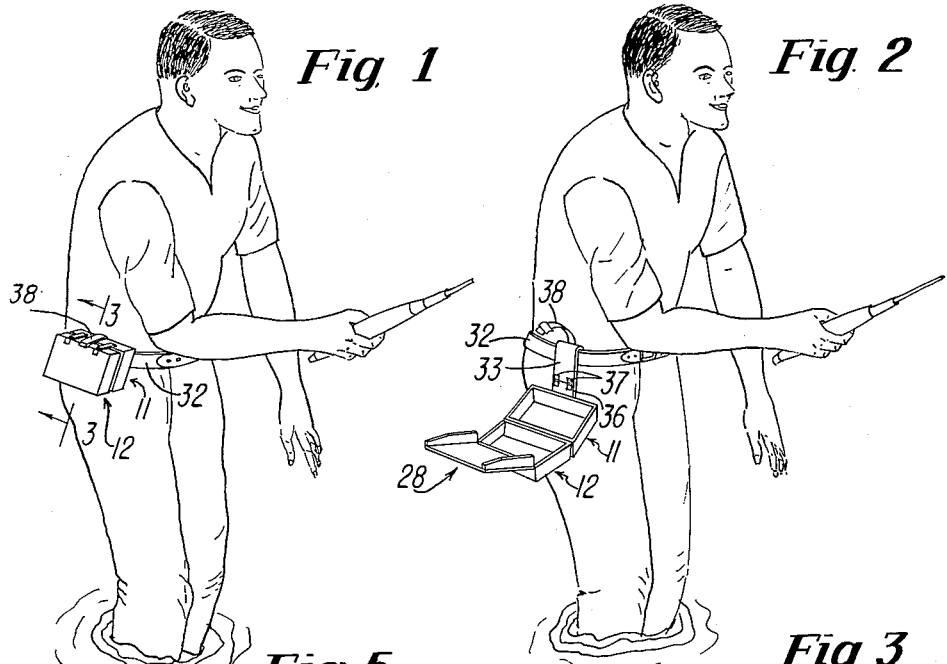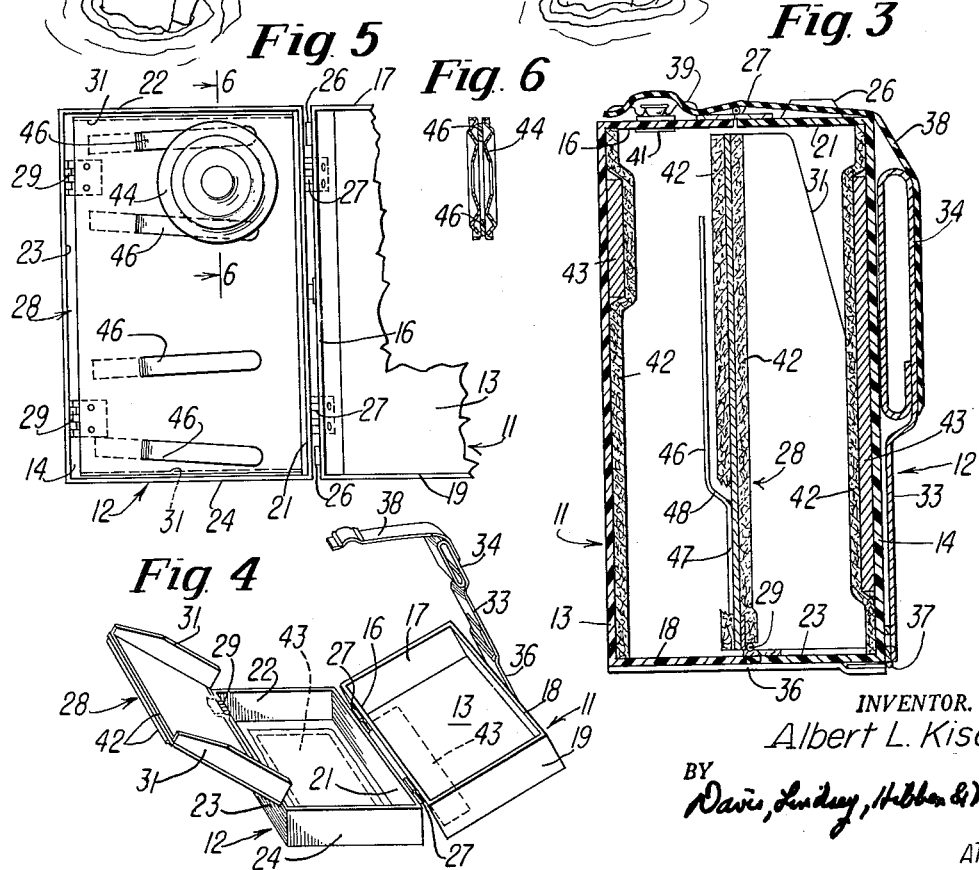

2,999,621
FOLDABLE TACKLE BOX
Albert L. Kiser, Scottsdale, Ariz., assignor to Product Development Corporation, a corporation of Arizona
Filed Apr. 7, 1959, Ser. No. 804,616
7 Claims. (Cl. 224—5)

This invention relates to fishing tackle boxes and more particularly to a novel folding fishing tackle box.

It is a primary object of the present invention to provide a novel compact fishing tackle box which can be carried on a fisherman's belt and which can be easily opened and closed while fishing without being detached from the belt.

Another object of the invention is to provide a tackle box of the foregoing character which folds out upon opening to provide a generally flat work area upon which a fisherman can conveniently retackle his line, wherever he may be.

Still another object of the invention is to provide a foldable tackle box which, when carried on the fisherman's belt, supports itself on the belt even when open so that the fisherman may keep both hands free for retackling his line.

A further object of the invention is to provide a compact, foldable tackle box adapted to contain numerous articles of tackle and to hold the articles in orderly arrangement.

Other objects and advantages of the invention will become apparent from the following description taken in conjunction with the accompanying drawing wherein:

FIG. 1 is a perspective view of a closed tackle box, embodying the features of the invention, mounted on the belt of a fisherman;

FIG. 2 is a view similar to FIG. 1 showing the box open;

FIG. 3 is an enlarged sectional view of the box taken along line 3—3 in FIG. 1;

FIG. 4 is an enlarged perspective view of the box in FIG. 1 in open condition;

FIG. 5 is a top plan view of a portion of the box shown in FIG. 1; and

FIG. 6 is a sectional view taken along line 6—6 in FIG. 5.

Broadly speaking, the objects of the invention are accomplished by providing a box comprising a plurality of tackle holding trays hinged together so that the trays progressively fold in one direction to close the box and progressively unfold in the opposite direction to open the box. After closure, the box is folded in the one direction against a carrying strap member adapted to be mounted on a fisherman's belt and is releasably fastened or latched to prevent unintentional unfolding of the box. When the box is unfolded or open, the trays mutually engage to provide a generally flat work area and the carrying strap member supports the open box in its flat condition so that no additional support is required.

As is shown in FIGS. 2, 3, 4, and 5, the box itself is a pair of similar open-faced rectilinear tray units, shown generally at 11 and 12, adapted to contain a number of articles of fishing tackle and the like. The units 11 and 12 have flat bottoms 13 and 14, respectively, the bottom 13 being bounded by upstanding side walls 16, 17, 18, and 19, and the bottom 14 being bounded by upstanding side walls 21, 22, 23, and 24.

The tray units 11 and 12 are hinged together to be foldable from a generally flat open position, shown in FIGS. 2 and 4, to a superposed face-to-face closed position. To this end a pair of common hinges 27 connect the adjacent side walls 16 and 21 of the units 11 and 12, respectively. The hinges 27 are fastened to the top edges of the side walls 16 and 21 as shown in FIG. 3 so that the tray unit 12 may be folded through approximately 180°. When open, the side 16 of unit 11 bears against abutment blocks 26, provided on the side 21 of unit 12 to hold the units in generally flat relation.

To provide additional tackle carrying capacity the instant tackle box is provided with another tray which, in this instance, is a leaf tray 28. The leaf tray 28 is a rectangular sheet of stiff material and is hinged by hinges 29 to fold into the top of the tray unit 12, as shown in FIGS. 3 and 5. The hinges 29 are connected to one side of the leaf tray 28 and to the top of the inside surface of wall 23 (see FIG. 3) so that the tray 28 will rest on the top edge of the wall 23 upon being unfolded through approximately 180° from the position shown in FIG. 5. When folded into the tray unit 12, the leaf tray 28 is held in spaced relation from the bottom 14 by elongated ribs or spacer flanges 31 provided on opposite side edges of the leaf tray. The spacer flanges 31 fit between and parallel to the sides 22 and 24 and rest on the bottom 14 when the leaf tray 28 is folded into the tray unit 12.

The present form of the tackle box is intended to be carried at the waist of a fisherman and its thickness, when closed, is considerably less than its width. Therefore, the box is most conveniently carried on edge as shown in FIGS. 1 and 3. The box is held suspended from a waist belt, such as 32, of a fisherman by a relatively wide and elongated stiff strap member 33. One end of the strap member 33 is formed into a loop 34 to receive a belt such as 32. The opposite end of the strap member 33 is hinged to a stiff member 36 by a pair of hinges 37 secured to the two members as shown in FIG. 3. The member 36 is, in turn, rigidly secured to the end wall 18 of unit 11 to form an extension thereof, the member 36 extending beyond the end wall 18 a distance substantially equal to the thickness of the tray unit 12. Thus, the closed box can be folded on the hinges 37 from an upright position perpendicular to the strap member 33 to an edgewise position in which the bottom 14 bears against the strap member 33. From it is apparent that the strap 33 provides all the support needed for the box, when the box is in either the open or the closed position and when the box is either on edge or upright. Moreover, being relatively wide, the strap member 33 prevents the box from tending to swing relative to the belt, such as 32, yet permits the box to be shifted to the most convenient position around the belt.

The box is provided with releasable latch or fastener means for holding the box closed and in the edgewise position shown in FIG. 1. In this instance the fastener means comprises an elongated pliable strap 38, such as rubber, having one end rigidly secured to the member 33, the strap extending from the member 33 across the end wall 21 to the end wall 16 when the box is closed and the bottom 14 rests against the member 33. The opposite end of the strap 38 is provided with one element 39 of a snap fastener. A mating element 41 of the snap fastener is mounted on the end wall 16 of the tray unit 11. The length of the strap 38 is such that the elements 39 and 41 of the snap fastener can be engaged only when the box is closed and folded against the member 33 as shown. Thus, the strap 38 and the snap fastener are adapted to releasably hold the box closed in edgewise position when the box is carried on a waist belt.

The tray units 11 and 12 and the leaf tray 28 are each provided with means for holding articles of fishing tackle and the like in order in the box, particularly during the folding and unfolding of the box. To this end the inner surfaces of bottoms 13 and 14 of the tray units 11 and 12 and both surfaces of the leaf tray 28 are covered with sheets 42 of felt-like material. Light weight lures and hooks can be snagged in this material and thus held in orderly arrangement.

Most hooks, lures and other heavy articles of tackle contain some iron material. These items are held in orderly arrangement in the box by magnets. In the present instance sheet magnets are fastened to the bottoms 13 and 14 of the tray units 11 and 12 and are covered by the sheets 42 of felt-like material. The magnets 43 will hold such iron articles in place in the box when the articles are merely placed on the sheets 42.

The present tackle box is also provided with means for holding leader and line material in orderly arrangement. To this end the leaf tray 28 is provided with two sets of arms adapted to hold leader and line spools (leader material is normally sold on small plastic spools such as 44 in FIGS. 5 and 6). Each set of arms comprises a pair of generally parallel arms 46. As shown in FIG. 3, one end of each arm 46 is secured to the surface of the leaf tray 28, as at 47, under the sheet 42 of felt-like material while the opposite end is left free. Each of the arms 46 is bent intermediate its ends, as at 48, to extend outwardly through the sheet 42 with its free end parallel to and spaced outwardly from the sheet 42. Also, the arms 46 of each set are laterally spaced with respect to each other, and are, thus, adapted for engaging and holding a spool, such as 44, in the manner shown in FIGS. 5 and 6.

From the foregoing it is apparent that the present invention provides a novel foldable tackle box which is adapted to be carried securely, during fishing, at the waist of a fisherman. The tackle box is compact when folded closed so that it will not get in the way of the fisherman. When open, the box provides a generally flat convenient work area on which the fisherman can retackle his line, even while in midstream, without danger of spilling the contents thereof.

Although the invention has been described in connection with a specific structural embodiment, it is to be understood that various modifications and alternative structures may be resorted to without departing from the scope of the invention as defined in the following claims.

I claim:

1. A foldable tackle box comprising a pair of rectilinear tray units, each having a flat bottom and upstanding side walls, one side wall of one unit being hinged to an adjacent side wall of the other unit for folding movement of said other unit relative to said one unit from an open position in which said units are in generally flat relation to a closed position in which said units are in superposed face-to-face relation, the opposite side wall of said one unit having a rigid upstanding extension, the length of said extension beyond said one unit being substantially equal to the thickness of said other tray unit, an elongated member hinged at one end to the upper end of said extension for a second folding movement of said units from a position generally perpendicular to said member to another position parallel to said member with the bottom of said other unit bearing against said member, said member including means at the opposite end for connecting the box to a waist belt, and means for releasably fastening said opposite end of said member to said one unit when said units are in said other position for holding said units closed in said other position.

2. The combination according to claim 1 in which said elongated member is of stiff material and the opposite end thereof is formed into a loop adapted to slidably receive a belt therethrough whereby the tackle box can be carried, both opened and closed, at the waist of a fisherman.

3. The combination according to claim 1 in which said fastening means comprises a pliable strap secured at one end to said member, one element of a snap fastener mounted on said one side wall of said one unit, and a mating element of the snap fastener mounted on said strap for engagement with said one element when the box is folded against said member.

4. A foldable tackle box comprising a pair of rectilinear tray units, each having a flat bottom and upstanding side walls, one side wall of one unit being hinged to an adjacent side wall of the other unit for folding movement of said other unit relative to said one unit from an open position in which said units are in generally flat relation to a closed position in which said units are in superposed face-to-face relation, a leaf tray hinged to said other tray unit and foldable into and out of said other tray unit when said tray units are in open position, the opposite side wall of said one unit having a rigid upstanding extension, the length of said extension beyond said one unit being substantially equal to the thickness of said other tray unit, an elongated member hinged at one end to the upper end of said extension for a second folding movement of said units from a position generally perpendicular to said member to another position parallel to said member with the bottom of said other unit bearing against said member, said member including means at the opposite end for connecting the box to a waist belt, and means for releasably fastening said opposite end of said member to said one unit when said units are in said other position for holding said units closed in said other position.

5. The combination according to claim 4 in which said leaf tray has means on one of its surfaces for holding articles of tackle in place.

6. The combination according to claim 5 in which said holding means comprises a pair of generally parallel laterally spaced arms, one end of each arm being secured to said one surface and the opposite end of each being free and spaced from said surface.

7. The combination according to claim 4 in which said leaf tray has a spacer flange on one edge, said flange being engageable with the bottom of said other tray for holding said leaf tray in spaced relation to said bottom when said leaf tray is folded into said other unit.

References Cited in the file of this patent

UNITED STATES PATENTS

| 2,110,572 | Foote | Mar. 8, 1938 |
| 2,370,941 | Dawson | Mar. 6, 1945 |
| 2,558,124 | Burden | June 26, 1951 |
| 2,685,363 | Falk | Aug. 3, 1954 |
| 2,792,961 | Gordon | May 21, 1957 |

FOREIGN PATENTS

| 294,298 | Great Britain | July 26, 1928 |